United States Patent [19]

Pundsack

[11] 4,025,183
[45] May 24, 1977

[54] CAMERA/PROCESSOR/PROJECTOR AND SUB-SYSTEMS

[75] Inventor: Arnold L. Pundsack, Penfield, N.Y.

[73] Assignee: Xerox Corporation, Stamford, Conn.

[22] Filed: May 28, 1975

[21] Appl. No.: 581,524

Related U.S. Application Data

[62] Division of Ser. No. 451,654, March 15, 1974, Pat. No. 3,951,324.

[52] U.S. Cl. .................................. 355/5; 226/55; 346/110 R; 354/78; 355/10
[51] Int. Cl.² ........................................ G03G 15/00
[58] Field of Search .................... 226/55–58; 352/241, 130, 133, 138; 354/76–78, 300, 317, 320, 321; 355/5, 10, 17, 20, 44, 45; 178/7.4; 346/110 R

[56] References Cited

UNITED STATES PATENTS

| | | | |
|---|---|---|---|
| 1,738,054 | 12/1929 | Hill | 352/241 X |
| 3,058,637 | 10/1962 | Gerlach | 226/58 |
| 3,428,395 | 2/1969 | Mitchell | 226/55 X |
| 3,528,355 | 9/1970 | Blackert | 355/27 X |
| 3,597,063 | 8/1971 | Hayashi et al. | 355/5 X |

*Primary Examiner*—L. T. Hix
*Assistant Examiner*—Kenneth C. Hutchinson

[57] ABSTRACT

A camera/processor/projector for continuously exposing, developing and projecting photographic film, and preferably photographic migration imaging film, is disclosed. In a preferred embodiment, a cathode-ray tube input is aligned with a camera through which the film passes on its way to a developer and projector for viewing on a screen which is adjacent said cathode-ray tube.

12 Claims, 13 Drawing Figures

FIG. 5
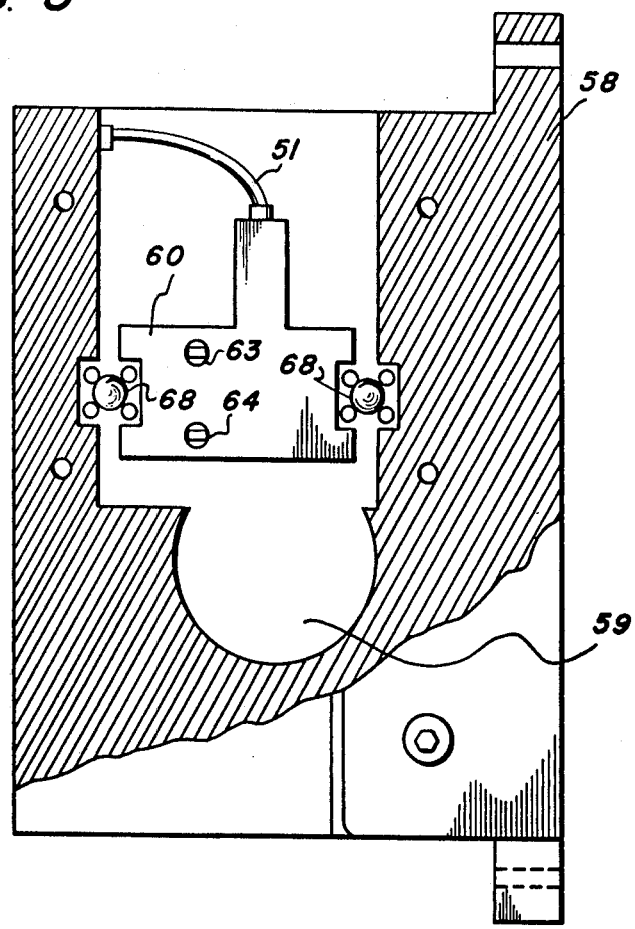
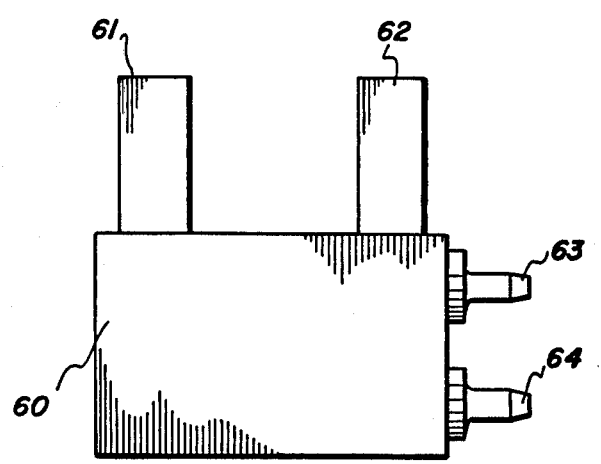
FIG. 6

CAMERA/PROCESSOR/PROJECTOR AND SUB-SYSTEMS

BACKGROUND OF THE INVENTION

The invention herein described was made in the course of a contract with the Naval Photographic Center, Anacostia, Md.

This is a division of application Ser. No. 451,654, filed Mar. 15, 1974, now U.S. Pat. No. 3,951,324.

This invention is directed in general to automatic camera/processor/projectors and in particular to automatic camera/processor/projectors capable of providing rapid access to both a visual, e.g., a projected image corresponding to the original exposure, and the processed film which provides a record of the original exposure.

The novel camera/processor/projector of the instant invention takes advantage of new and simplified imaging systems which are capable of micro-image format of high density, continuous tone and high resolution. As will be explained further, preferred embodiments of the invention employ the process variations of these new systems to provide apparatus which can operate at from very low rates to camera framing rates suitable for motion picture reproduction.

The storage of information on micro-film evolved as on special application of conventional photographic technology. As a result, process orientation was based on the processing of photographic film, not on the processing of information. Adhering to the relatively complex darkroom technique used for conventional film, usual rapid processing equipment is engineered for the economics of high volume bulk processing of motion picture film. In rapid processing display systems such as those shown in the Tuttle U.S. Pat. No. 2,922,352 issued Jan. 26, 1960; or the Orlando U.S. Pat. No. 2,856,829, issued on Oct. 21, 1958 apparatus is shown for rapid camera processing systems using a chamber method of development. In these and other simple camera/processors, multiple low viscosity processing fluids are drawn from suitable containers across the emulsion side of silver halide film either by positive pressure or a suction pump. Another developmental recorder/processor/projector system was described in an S.P.S.E. Conference in Chicago in May of 1967 (T. E. Gagnon "Rapid Reversal Process for CRT Images," S.P.S.E. Conference, Chicago; May 1967, p. 85). Negative images are created therein by a process similar to those described immediately above.

An example of the new imaging system of the type considered to be useful in the camera/processor/projector of the instant invention is that which is described in U.S. Pat. No. 3,520,681. Generally, according to an embodiment thereof, an imaging member comprising a conductive substrate with a layer of softenable (herein also intended to include soluble) material, containing photosensitive particles overlying the conductive substrate is imaged in the following manner: a latent image is formed on the member for example, by uniformly electrostatically charging and exposing it to a pattern of activating electromagnetic radiation. The imaging member is then developed by exposing it to a solvent which dissolves only the softenable layer. The photosensitive particles which have been exposed to radiation migrate through the softenable layer as it is softened and dissolved, leaving an image of migrated particles corresponding to the radiation pattern of the original on the conductive substrate. The image may then be fixed to the substrate. Through the use of various techniques, either positive to positive or positive to negative images may be made. Those portions of the photosensitive material which do not migrate to the conductive substrate may be washed away by the solvent with the softenable layer.

In general, three basic imaging members may be used. A layer configuration which comprises a conductive substrate coated with a layer of softenable material, and a fracturable and preferably particulate layer of photosensitive material or imbedded near the upper surface of the softenable layer; a binder structure in which the photosensitive particles are dispersed in the softenable layer which overcoats a conductive substrate; and an overcoated structure in which a conductive substrate is overcoated with a layer of softenable material followed by an overcoating of photosensitive particles and a second overcoating of softenable material which sandwiches the photosensitive particles.

The characteristics of the images produced in this new system are dependent on such process steps as charging, exposing and developing, as well as the particular combination of process steps. High density, continuous tone, and high resolution are some of the image characteristics possible. The image is generally characterized as a fixed or unfixed particulate image with or without a portion of the softenable layer in unmigrated portions of the layer left on the imaged member, which can be used in a number of applications such as microfilm, hard copy, optical masks, and strip-applications using adhesive materials.

Two camera/processors for migration imaging film are described in U.S. Pat. No. 3,528,355 and U.S. Pat. No. 3,542,465.

SUMMARY OF THE INVENTION

It is an object of this invention to provide a unique high-speed camera/processor/projector utilizing photographic film and preferably photographic migration imaging film.

It is another object of this invention to provide a unique, compact, high-speed camera/processor/projector for migration imaging films which is reliable, simple and convenient to use.

It is another object of this invention to provide a camera/processor/projector which utilizes a cathode-ray tube input and two output screens, one adjacent said cathode-ray tube for verification and one remote for general viewing.

It is a further object of this invention to provide a unique high-speed camera/processor/projector which allows almost immediate comparison and verification of input and output image quality and content, and in a preferred embodiment utilizes a cathode-ray tube image input and an adjacent projection screen for verification.

It is a still further object of this invention to provide a camera/processor/projector with a unique film grounding arrangement which insures maximum imaging efficiency and quality.

It is a still further object of this invention to provide a camera/processor/projector which is capable of accepting optical or electrical input for microfilming and verifying images at motion picture camera framing rates.

It is a still further object of this invention to provide a camera/processor/projector which is capable of copying from a variable input and projecting onto a viewing screen adjacent said variable input and/or selectively projecting onto a remote viewing screen.

It is an even still further object of this invention to provide a novel high-speed film registration and grounding apparatus.

Another object of this invention is to provide a novel drying enclosure through which the film travels after development to remove excess solvent vapors.

Another object of this invention is to provide a novel drag sprocket for damping perturbations in a moving web.

The above and other objects are accomplished by providing a camera/processor/projector for continuously exposing, developing and projecting photographic film, and preferably photographic migration imaging film. In a preferred embodiment, a cathode-ray tube input is aligned with a camera through which the film passes on its way to a developer and projector for viewing on a screen which is adjacent said cathode-ray tube.

BRIEF DESCRIPTION OF DRAWINGS

The advantages of this invention will become apparent upon consideration of the following detailed disclosure of the invention, especially when it is taken in conjunction with the accompanying drawings wherein:

FIG. 5 is a partially schematic, partially cross-sectional front plane view of the registration pin assembly;

FIG. 6 is a side plane view of the registration pin holder and pins;

DESCRIPTION OF THE PREFERRED EMBODIMENTS

Figure 1A:
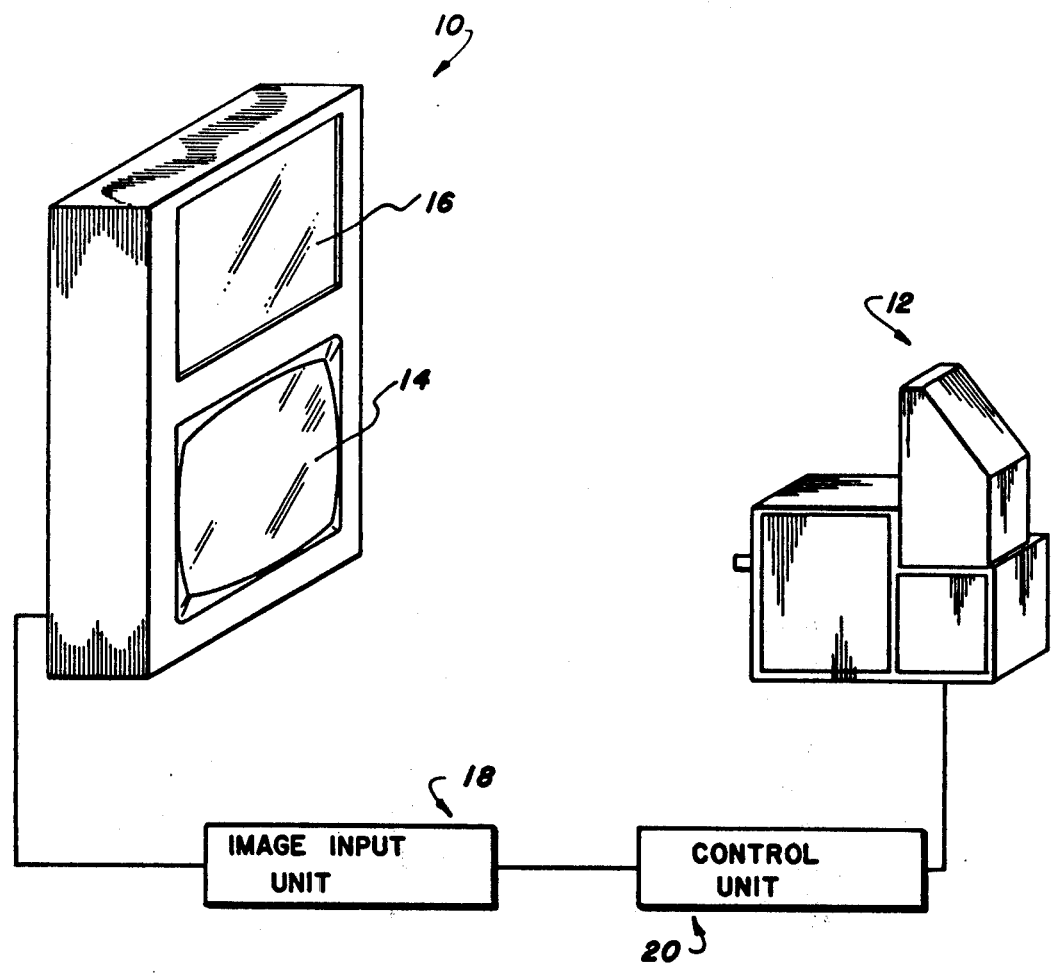
FIG. 1a is a schematic representation of the entire imaging system of the instant invention.
Figure 1B:
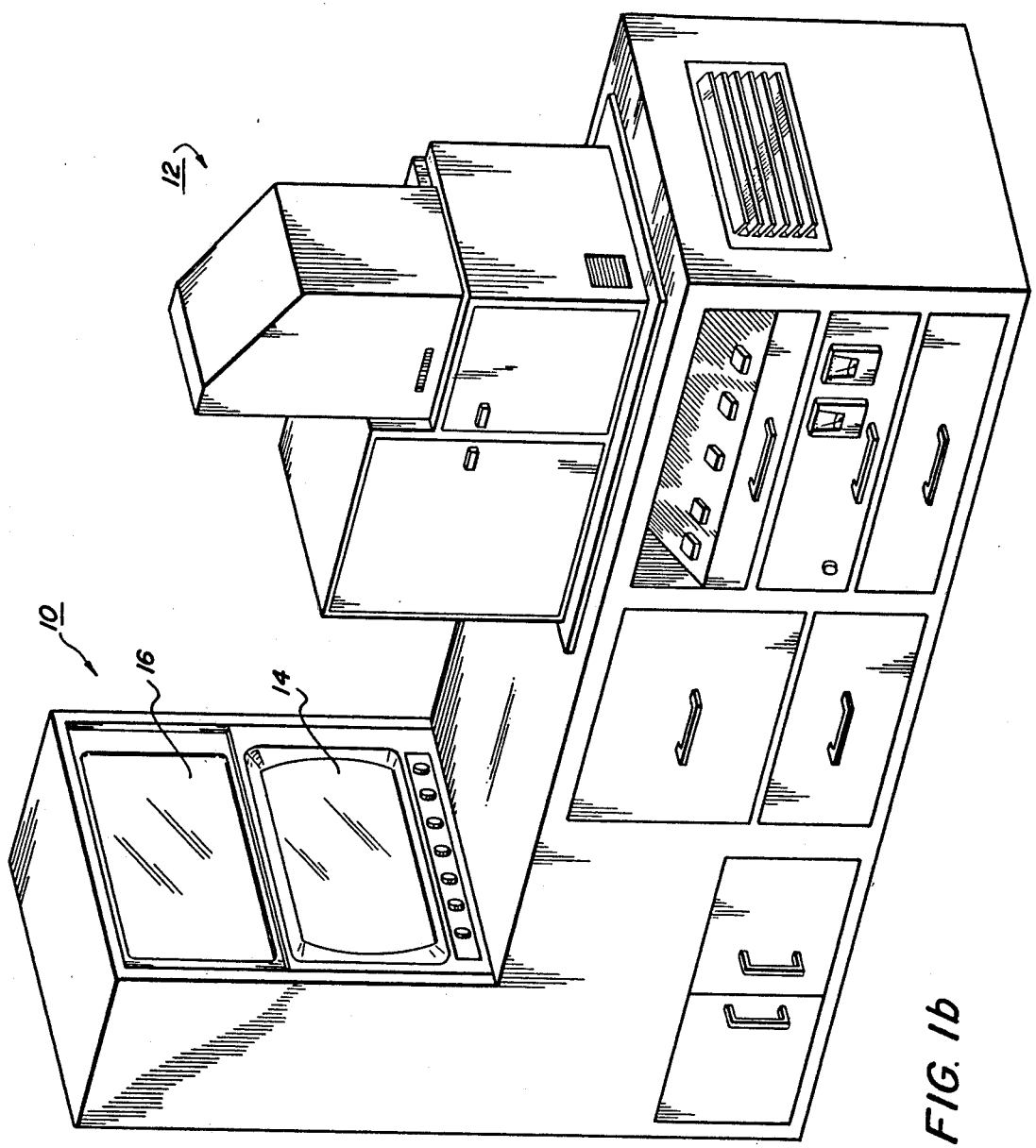
FIG. 1b is a perspective view showing a preferred embodiment of the imaging system and the relationship of the various elements.

Referring now to FIGS. 1a and 1b the overall imaging system of the instant invention is shown to include two main components, input and projection screen unit 10 and the camera/ processor/projector unit 12. Generally, the camera/processor/ projector unit has input and output optics aligned with the original image input display device 14 and projection screen 16, respectively. Projection screen 16 is normally an opaque reflection surface. Any conventional projection screen may be used. Original image input display device 14 is, in preferred embodiments, a cathode-ray tube such as normally used in high quality video display.

It is to be noted that the original image input display device 14 and the projection screen 16 are located adjacent to each other and directly in alignment with the input and output optics of the camera/processor/projector in such a manner that the input and output can be visually compared by a single operator to verify the nature, e.g., the quality and resolution, of the image reproduced.

FIG. 1a also shows the general inclusion of image input unit 18 and control unit 20. The unit 20, to be discussed in greater detail below, directs the overall sequential operation of the entire imaging system. Image input unit 18 can be any of such devices well known in the art. For example, unit 18 could be a video tape player, a television camera or specialized computer output apparatus.

FIG. 1b is a more detailed perspective of the imaging system showing the arrangement of major elements and advantageous relationships therebetween. Note that elements 10 and 12 can be integrated into a single unit optically aligned for simultaneous viewing of input and output images.

Figure 2:
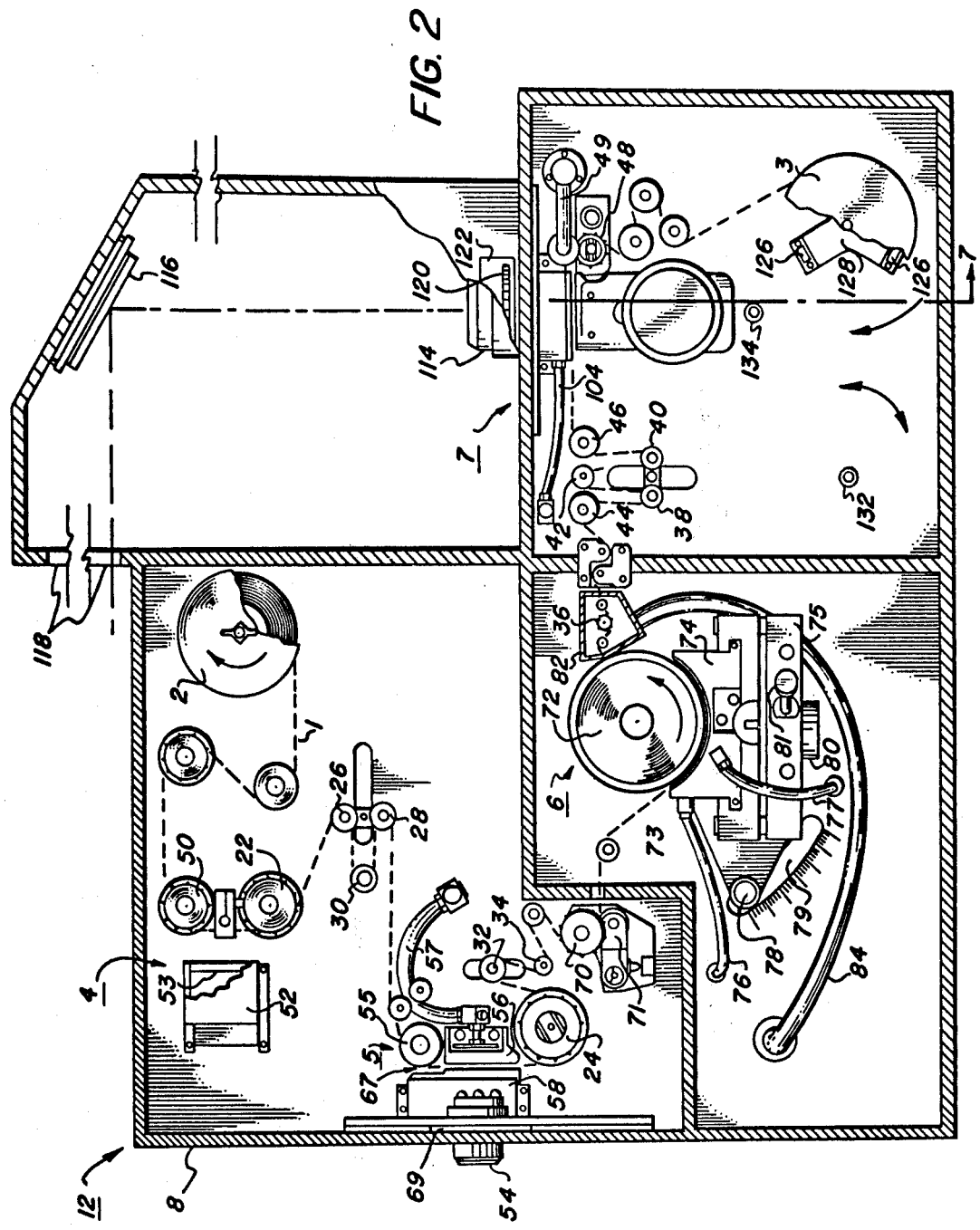
FIG. 2 is a side plane view of the camera/processor/projector.

The preferred embodiment of the camera/processor/projector 12, shown in FIG. 2, is designed to record the image from an original image input display device 14 on 16 mm single side perforated film and also to process and to project the image thus recorded onto a projection screen 16 immediately thereafter in a continuous "on-line" process. The camera/ processor/projector 12, together with the control unit 20, is a pulse motion 16 mm film handling system. This system is capable of accepting continuous pulses at the rate of one per every 66.66 msec (milliseconds), which provides a framing rate of 15 frames per second. Complete access to the reproduced image is provided in as little as 6.5 seconds, i.e., a visual image can be projected from a completely dry processed film within this time frame.

The operation of the camera/processor/projector can best be seen in the plane view of FIG. 2. This Figure shows the apparatus and steps necessary to completely and rapidly expose, process and project migration imaging film. The cabinet 8 is generally of metallic construction and is divided into compartments for ease of assembly and servicing. As the film 1 moves from the supply reel 2 to the take-up reel 3, it passes through the different process stations, i.e., charging 4, exposure, 5, development 6, and projection 7.

The various stations throughout the system require different types of film motion, i.e., charging and development should be continuous for best results while exposure and projection should preferably be intermittent. To produce these varying film motions, a series of drive and buffer mechanisms have been employed. Continuous film drive sprocket 22 moves the film uniformly through charging station 4 toward exposure station 5 and intermittent drive sprocket 24. As a motion changes from continuous to intermittent, it is necessary that a temporary film storage or buffer, be created. Dancer loop rollers 26 and 28, together with guide roller 30, perform this function. Dancer loop rollers 26 and 28 are structurally united on a frame which is biased via a negator spring assembly away from stationary guide roller 30. As the film is advanced by intermittent drive sprocket 24, dancer loop rollers 26 and 28 move toward stationary guide roller 30, and, as the film is advanced by continuous drive sprocket 22, the dancer loop rollers move away from the guide roller. A single dancer loop roller 32 is used as a buffer between intermittent film drive sprocket 24 and the continuous film drive sprocket 36. This dancer loop roller moves toward and away from stationary guide roller 34 as the film is advanced by the two drive sprockets. A third buffer system is positioned between continuous film drive sprocket 36 and the intermittent film drive sprocket 48 in the projection system. Dancer loop rollers 38 and 40 move toward and away from stationary guide rollers 42, 44 and 46 as the film is advanced. The remaining rollers in the system are used to guide the film between the stations.

Figure 3:
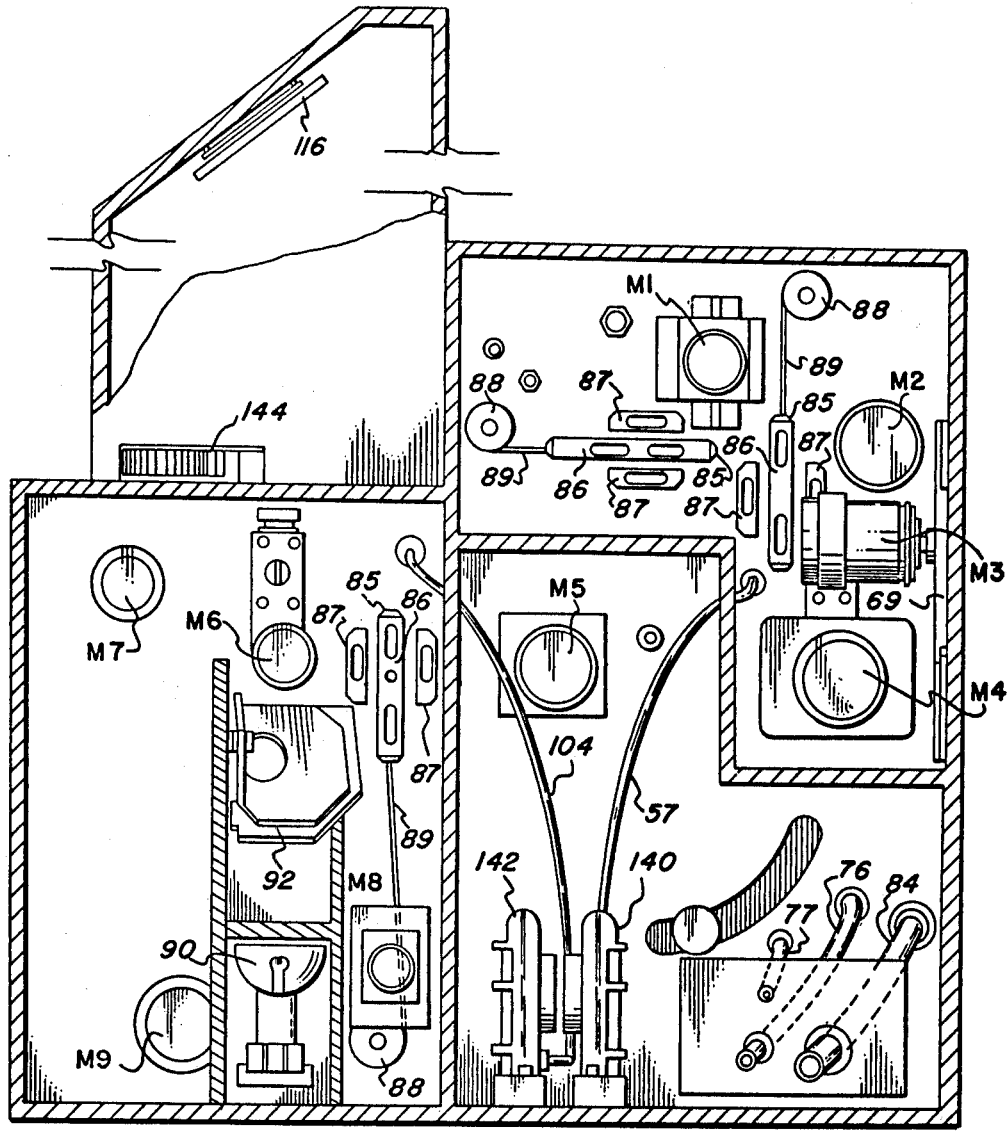
FIG. 3 is another side plane view of the camera/processor/projector opposite to that of FIG. 2.

The dancer loops rollers 26–28, 32 and 38–40 function in the same manner and are constructed similarly. Attention is directed to FIG. 3 wherein the operation of these elements can be seen. Each of the slots 85 contains a slide 86 which is attached to the dancer loop roller. The slide 86 is slidingly attached to guide members 87 by bearing surfaces which allow movement of the slide along the axis of the slot. Stationary negator spring drum 88 is attached to cable 89 which is in turn attached to slide 86. As the dancer loop rollers are pulled in the direction opposite to that of the spring drum, a constant adjustable tension is applied thereto.

The nature of the migration imaging process and imaging members makes it desirable and advantageous that the film be grounded at specific locations in the film transport system. More specifically, the apparatus shown in FIG. 2 is grounded by conductive sprockets 50, 22, 24, 36, and 48. These sprockets have teeth which engage film perforations and thereby form an electrical contact with the conductive portion of the film. Such a sprocket and drive and electrical contact system is disclosed in copending U.S. patent application Ser. No. 341,653, filed on Mar. 15, 1973, now U.S. Pat. No. 3,910,475. Additionally, the film reel spools 2 and 3 are conductive and grounded. Furthermore, the registration pins of the exposure station 5 described below are also grounded.

Charging Station

In charging station 4, film sensitization is accomplished by providing a uniform electrostatic charge thereon. Here, a stationary corona discharge unit 52 comprised of discharge wire 53 with a positive bias deposits the charge upon the moving film 1 as it moves between sprockets 50 and 22. Typical corona discharge systems are described by Carlson in U.S. Pat. No. 2,588,699. Alternatively, the film could be contact charged as described by Carlson in U.S. Pat. No. 2,797,691, by means of a roller held at a high potential as described by Gregay et al in U.S. Pat. No. 2,980,834 or by means of a conductive liquid at a high potential as described by Walkup in U.S. Pat. No. 2,987,600. Any suitable charging means may be used.

Exposure Station

As the charged film passes through film gate 67 from guide roller 55 to intermittent film drive sprocket 24, it is held in a generally flat plane by vacuum platen 56. This vacuum platen is known in the art and will be discussed in further detail below; however, it should be noted at this time that the platen is connected to a source of vacuum by vacuum hose 57.

Figure 4:
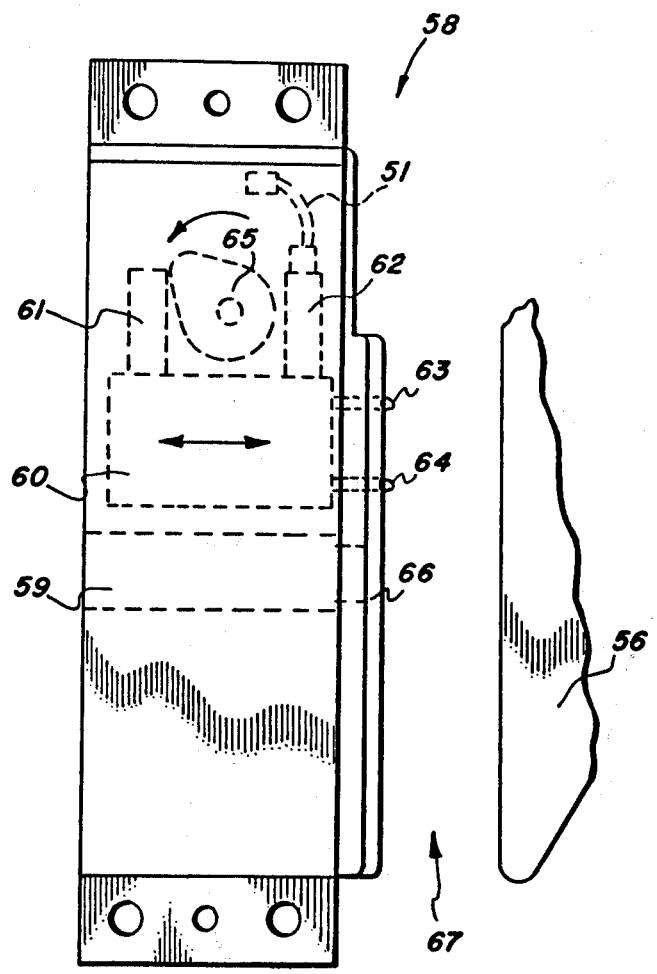
FIG. 4 is a partially schematic side plane view of the registration pin assembly.

Referring now to FIGS. 4–6, the film gate and registration pin assembly will be discribed. Image carrying radiation passes through lens 54 and thence through aperture 59 in registration pin housing 58 to the film which rests upon vacuum platen 56. In FIG. 4, the opening, or film gate, 67 is greatly exaggerated, and, in fact, the platen is normally in contact with film edge guide 66.

The registration pin assembly performs a very important function to the proper operation of the camera/processor/projector. No matter how fast film moves through a camera, each frame must be individually exposed while it is effectively stationary with reference to the lens, i.e., each frame must be registered for a period of time with the aperture in order to obtain a satisfactory exposure. The registration pin assembly of the instant invention solves this problem in a very simple and satisfactory manner.

As the film is advanced the distance of one frame from guide roller 55 to sprocket 24, it is held against vacuum platen 56 by the slight vacuum therein contained. Since the edge of the film is in sliding contact with the film edge guide 66, the film perforations will always be in the same vertical plane and generally in the same horizontal plane. The tapered registration pins 63 and 64 move into and out of registry with the perforations in the sequence shown in FIG. 9. The pins themselves are accurately spaced from the lens aperture and are fully the same size as the perforations and thereby cause the film to move, however slightly, into exact registry with the aperture 59.

Pins 63 and 64 are attached to registration pin carrier 60 which, in turn, has legs, or cam followers 61 and 62 extending therefrom. Attached to the rotating shaft of drive motor M2 (see FIG. 3) is cam 65 which extends through housing 58 to a position between the followers 61 and 62, as shown in FIG. 4. As cam 65 rotates, it alternately contacts followers 61 and 62 thereby impart reciprocating motion to the pin carrier 60. As can be seen in FIG. 5, the carrier is mounted on low friction bearing surfaces 68 to allow freedom of movement. Furthermore, it should be noted that the registration pin assembly is electrically grounded by wire 51 (FIGS. 4 and 5) which is attached to pin carrier 60 and housing 58.

Camera shutter mechanism 69 is not shown in detail because any conventional shutter known in the art can be adapted to perform the necessary function. For example, a flat disk with a single aperture can be rotated by motor drive unit M3 at 900 rpm to shutter the camera aperture at a rate of 15 frames per second.

As previously explained, dancer loop 32 serves as a buffer between intermittent drive sprocket 24 and continuous drive sprocket 36. To insure that the perturbations created by the motion of the dancer loop are not passed to the development station 6, an additional toothed sprocket 70 and spring-loaded follows 71 have been integrated into the film transport system. The teeth of sprocket 70 completely fill the film apertures and therefore do not allow unwanted film motion to pass on to the development station. The spring-loaded follower rides along the sprocket-film interface and further insures that the film does not "jump" or leave the sprocket teeth. It should be noted that spring-loaded follower 49 in the projection station serves the same purpose with regard to sprocket 48.

Figure 12:
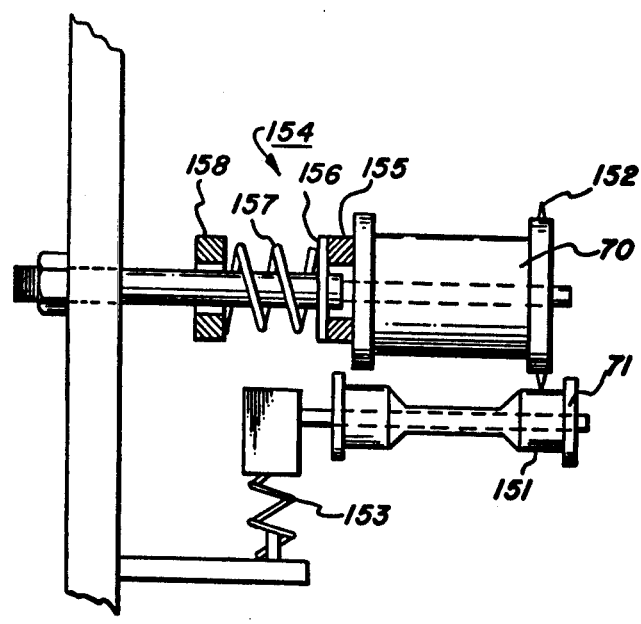
FIG. 12 is a partially schematic, partially cross-sectional view of drag sprocket 70 and biased roller 71.

A more detailed view of the sprocket 70 and follower 71 is shown in FIG. 12. This section drawing shows that the flat surface 151 of follower 71 rides in contact with the teeth 152 of sprocket 70. Follower 71 is biased into continuous contact with the sprocket by spring 153. This figure further shows that sprocket 70 has an adjustable drag mechanism 154 coupled thereto to provide means for controlling the damping action. A friction ring 155 is fixedly attached to the end of sprocket 70. Washer 156 is pressed into contact with the friction ring by spring 157 which is held in place by lock roller 158. To adjust drag, it is only necessary that the lock roller be moved relative to the sprocket 70.

Development Station

After charging and imagewise exposure, the latently imaged member is developed by reducing the resistance of the softenable material to migration of the migration material sufficient to allow migration of the migration material in depth in the softenable material. The preferred embodiment herein disclosed includes a meniscus development station 6. Meniscus development requires the creation of a liquid solvent meniscus through which the latently imaged member passes to cause development. Attention is directed to copending U.S. patent application Ser. No. 382,786, now U.S. Pat. No. 3,878,816, filed on July 26, 1973, wherein liquid meniscus development processes and apparatus are disclosed, the entire disclosure of which is hereby expressly incorporated herein by reference.

The development station 6 comprises a freely rotatable drum 72 spaced apart from a shoe member 74 having a curved surface corresponding to the curvature of the drum. Solvent development fluid is supplied to the gap 73 between the drum and the shoe by tube 76. A meniscus is formed by the fluid at each end of the gap 73, and, as the film passes therethrough, the latent images are developed. Excess fluids are removed from the gap via drain tube 77 to a collection container (not shown). In order to vary the size of the gap an adjustment micrometer 80 and lock screw 81 moves the shoe 74 relative to the stationary shoe support 75. The relative positioning of the shoe with respect to the surface of the drum is also made variable for improved development. Lock screw 78 allows the entire shoe apparatus to selectively rotate along the axis of slot 79.

After the film is developed and breaks contact with drum 72, it passes into drying chamber 82 and then to a conventional light trap 83. The chamber is attached to a source of vacuum (not shown) by hose 84 which serves to remove excess solvent vapors from the surface of the film. Additionally, since the chamber is not completely sealed, excess vapor from around the entire development station is removed.

Projection Station

Figure 7:
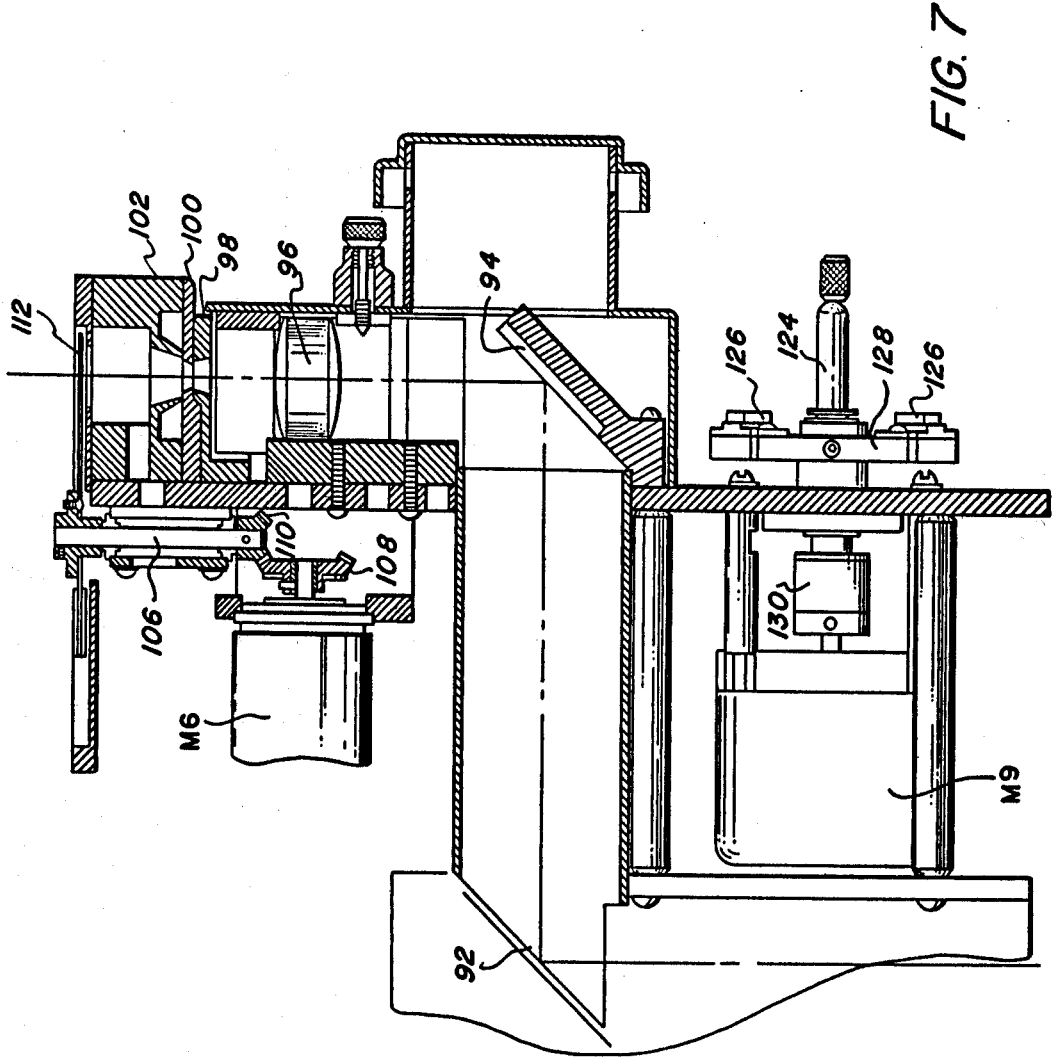
FIG. 7 is a cross-sectional view of the projection assembly as taken along lines 7—7 of FIG. 3.

The illumination system for the projection station can best be seen by referring to the rear plane view of FIG. 3 and the sectional view of FIG. 7. Lamp 90 directs illumination upward to mirror 92 which reflects the light in a horizontal direction. Mirror 94, FIG. 7, then redirects the illumination upward through condensing lens 96, film vacuum platen 98, aperture plate 100 and aperture block 102. Film vacuum platen 98 is attached to a source of vacuum, pump 142, by hose 104.

The projection shutter mechanism is best shown in the sectional view of FIG. 7. Shutter drive motor M6 is connected to shaft 106 via bevel gears 108 and 110. As rotational motion is imparted to shaft 106, the shutter 112 is rotated about the shaft and thereby intermittently shutters the aperture. The shutter is relatively conventional in the art, consisting of a flat disk with a single aperture therethrough.

The projection station further includes the projection lens 114, which can be of any suitable type such as NIKKOR 45 mm available from Nikon Camera Co., and projection mirror 116. The image whic is reflected by mirror 116 goes through opening 118 in the cabinet 8 to a projection screen 16, FIG. 1a. The lens 114 is movably mounted so that the focus can be adjusted by gear arrangement 120 which slightly protrudes from cabinet 8 through slot opening 122.

Film take-up reel 3 is mounted to spindle 124 (see FIG. 7 with reel removed) and held in place by friction pads 126 mounted on support assembly 128. Take-up motor M9 is attached to spindle 124 by coupling 130.

To effect rewind or the projection-only mode, auxiliary spindle 132 is employed. For rewind the film would be wound over guide roller 134 to a reel on auxiliary spindle 132. For the projection-only mode, a supply reel of developed film would be attached to spindle 132 and the film fed from there directly to the projection vacuum platen and then to take-up reel 3.

Figure 10:
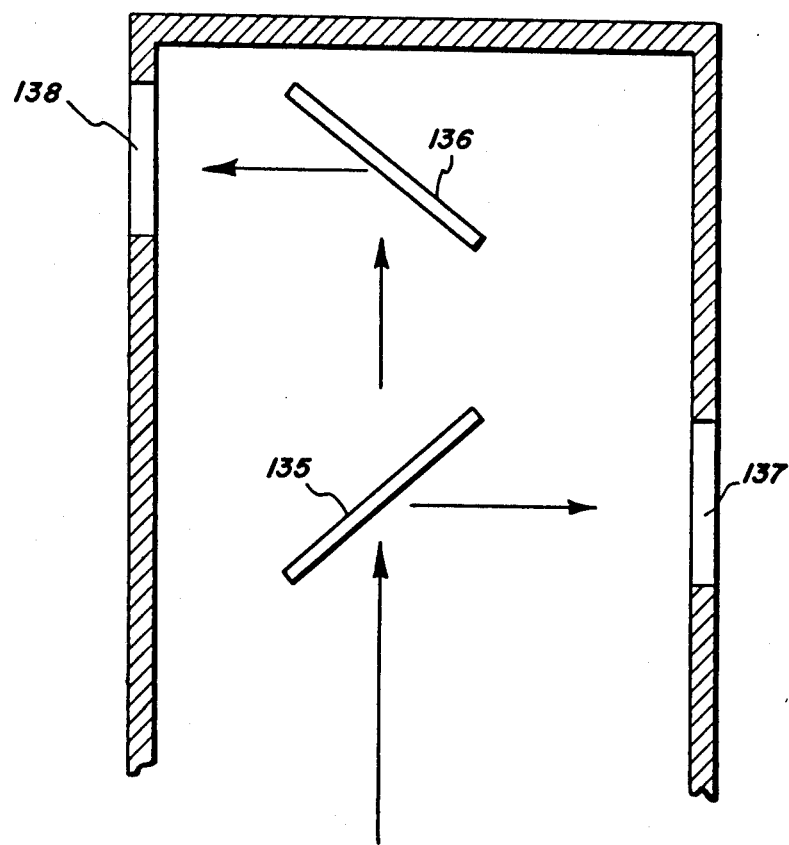
FIG. 10 is a partially schematic, partially cross-sectional view of an alternate embodiment of the projection display optics.

An alternative embodiment of the projection display optics is shown in FIG. 10. Image carrying radiation from the projection lens is directed toward the two mirrors 135 and 136 which co-act as a beam splitter to send images in two different directions simultaneously. Mirror 135 is only 50% reflective, i.e., allows 50% of the light to pass through to mirror 136 and reflects 50% through opening 137. Mirror 136 then reflects 100% of the light received through opening 138. This arrangement then would allow, in the environment of the camera/processor/projector herein described, viewing of the image on a larger screen by more persons. Furthermore, by making mirror 135 movable from the location indicated to one out of the light path it would be possible to make the number of viewing planes selectible.

Figure 11:
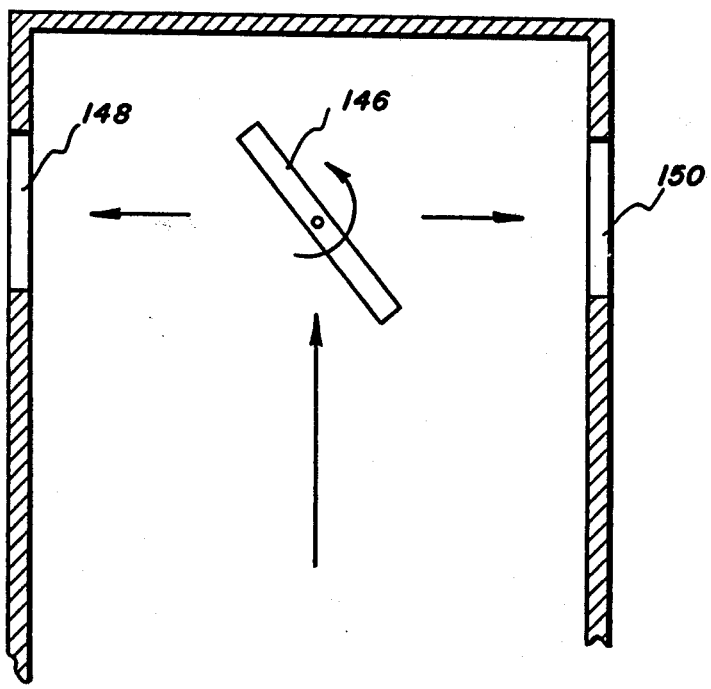
FIG. 11 is a partially schematic, partially cross-sectional view of another alternative embodiment of the projection display optics.

Another alternative embodiment of the projection display optics is shown in FIG. 11. This particular arrangement of elements does not provide simultaneous viewing on two screens; however, it does allow selection of one of two screens. The cabinet has two opposing projection slots, 148 and 150, one of which would be aligned with display screen 16 and the other of which would be aligned with a second screen (not shown). Mirror 146 is rotatably mounted for selective rotation to reflect radiation through either of the slots.

Fluid Handling and Vacuum

Each of the camera and projection stations contains a vacuum platen (56 and 58, respectively) which serves to hold the film in a generally flat plane while exposure and projection are being effected. Any suitable vacuum platen may be used, see for example, U.S. Pat. No. 3,528,355 and 3,645,621, and generally comprises a continuous channel surrounding the aperture over which the film passes. The channel, in turn, is connected to a source of vacuum. Camera vacuum platen 56 is attached to vacuum pump 140 by vacuum hose 57 and projection vacuum platen 98 is attached to vacuum pump 142 by vacuum hose 104. An additional vacuum pump (not shown) is attached to the drying chamber 82 by vacuum hose 84. The development fluid used in station 6 is supplied via tube 76 from a pump (not shown). A gravity fed drain tube 77 removes excess development fluid from the shoe 74 to a container (not shown).

Suitable conventional items can be used, or readily adapted for use, for all items not described in detail herein.

Drive Motors

The preferred embodiment of the camera/processor/projector herein disclosed contains 8 separate primary DC motor drive units and one AC motor drive unit. Referring now to FIGS. 2 and 3, 28 VDC continuous motor drive unit M1, together with sprocket 22 move the film at a constant rate of 4½ inches per second (equivalent to 15 frames per second) through the charging unit 4. 28 VDC drive motor M5 and sprocket 36 have a relationship similar to that set forth immediately above, and therefore move the film through the development section 6 at 4½ inches per second.

28 VDC motor drive unit M2 imparts reciprocating motion to the registration mechanism as discussed above in the section entitled "Exposure Station." M3 is also a 28 VDC motor and its function is to drive the shutter mechanism 69.

M4 is a 25 VDC motor drive unit which, through sprocket 24, intermittently moves the film through exposure station 5. M4 is a stepper or pulse motor which, upon activation, makes four pulses of 1.8° per pulse. In the preferred embodiment, this total of 7.2° to equivalent to 0.300 inches, or one frame.

Motor drive unit M6, as discussed above in the "Projection Station" section, is a 28 VDC continuous drive motor and rotates the projection shutter at 3600 rpm. which effectively shutters each frame four times before the film is advanced.

Projection drive motor unit M7 is a 28 VDC 90° stepper motor and, through a Geneva mechanism (not shown) pulses the film through the projection station 7 one frae at a time.

M9 is another motor drive unit; however, unlike the others, is AC rather than DC. This torque motor drives the film take-up spool 3 and, in the rewind mode, serves to provide a back tension to insure a tight winding.

M8 is also a 28 VDC motor drive unit and powers the auxiliary spindle 132. This motor is reversible to allow power in the rewind mode and in the projection-only mode.

Power and Control

Figure 8:
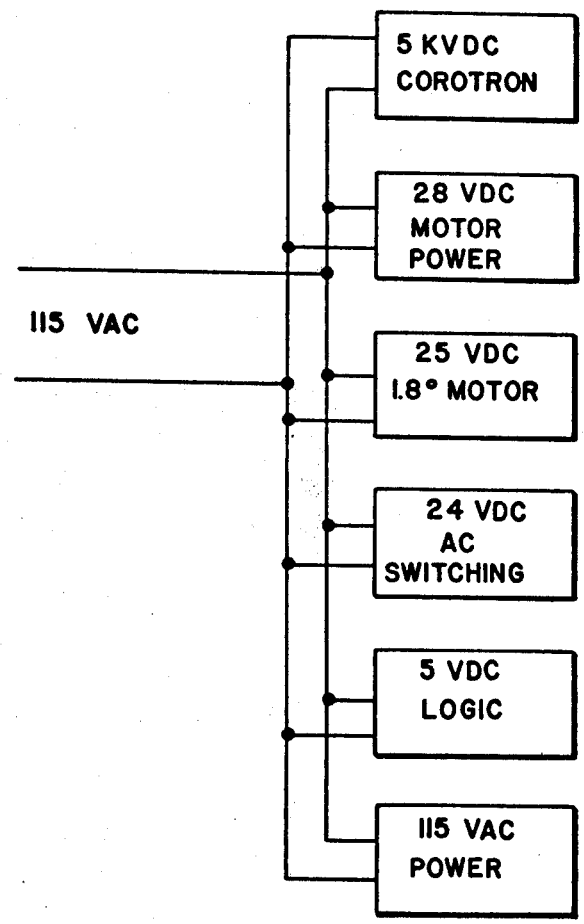
FIG. 8 is a schematic representation of the power input and breakdown within the control unit.

Referring to FIG. 8, the power input and breakdown within control unit 20 (FIG. 1a) is shown. The 115 VAC input is stepped down by appropriate transformer and rectifiers to 28, 25, 24, and 5 VDC segments. As specified in the "Motor Drives" section, the 28 and 25 VDC outputs are used to power the majority of the DC drive motors of the camera/processor/projector.

The corotron used in charging station 4 requires a relative high DC voltage, as indicated in the uppermost box of FIG. 8. Here again, transformers and rectifiers are used to alter the 115 VAC input to a specific output value.

The 24 VDC output controls the AC switching within the system, i.e., energizes the relays to effect AC switching.

The logic circuitry of the control unit 20 is operated on the 5 VDC output segment. The logic circuitry, preferably solid state, performs the sequential operation to be described below in regard to FIG. 9.

An unaltered segment of the 115 VAC input is used to power several of the system elements. More specifically, all of the vacuum pumps, cooling fan 144 for the illumination section, lamp 90, input display device 14 and motor drive unit M9 are all operated on AC.

Figure 9:
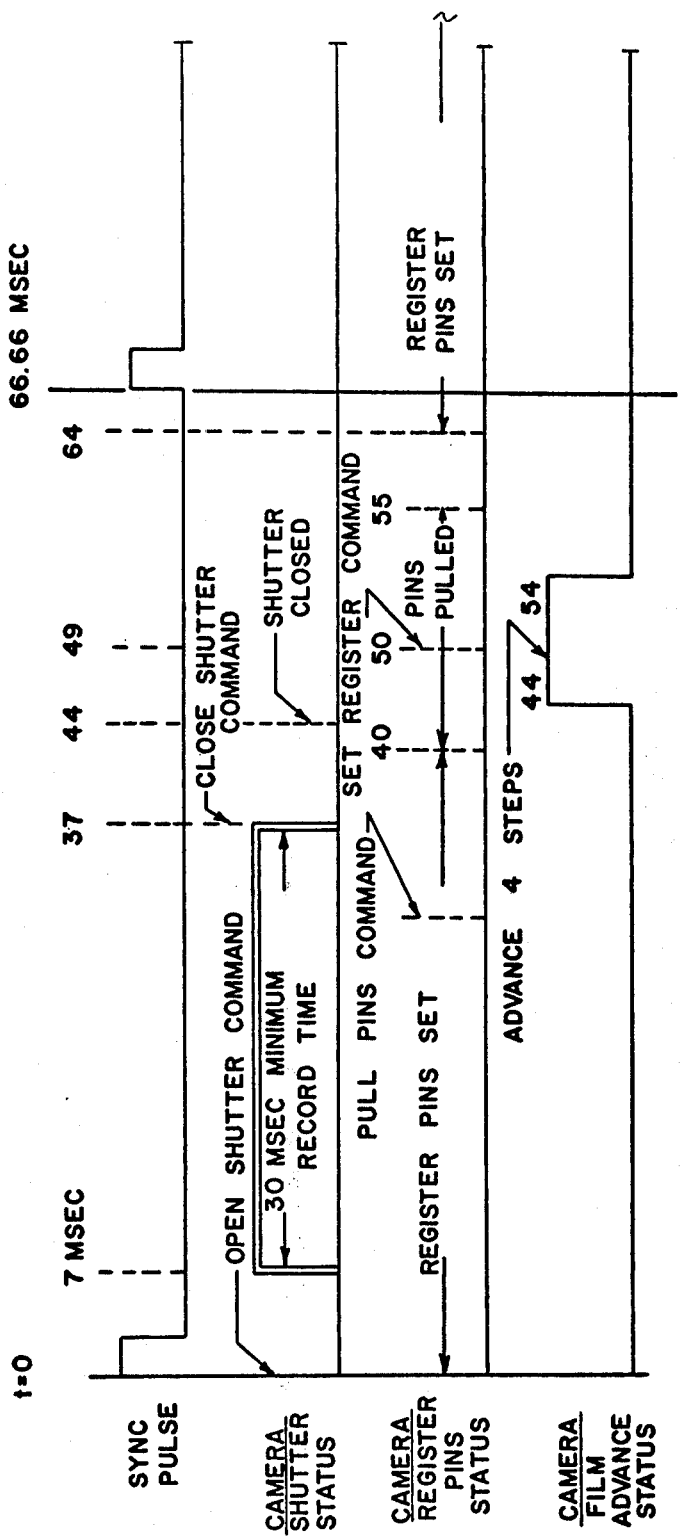
FIG. 9 is a time/sequence chart of the system operation.

Referring now to FIG. 9, the time/sequence operation of the camera/processor/projector can be seen. The system operates at the rate of 15 frames per second, which is equivalent to 4½ inches of film movement per second (each frame being 0.3 inches). One complete cycle occurs in 66.66 msec. When the system is ready for operation, the following chain of events takes place with a sync pulse is transmitted to the system circuitry:

1. Camera shutter open command is initiated and the camera shutter is fully open in about 5–7 msec. thereafter.
2. Approximately 30 msec. after the camera shutter is fully open, a close shutter command is initiated (the 30 msec. interval is the writing time of the film).
3. A few milliseconds after the shutter is closed, the register pins are pulled out of the film.
4. When the register pins are completely out of the film, a signal indicates that the film may be advanced by the motor drive unit M4.
5. The motor drives unit M4 will advance 4 steps in approximately 10 msec., corresponding to one frame incrementing.
6. After M4 has incremented, the proper signals are initiated to set the register pins into the film.
7. The register pins will be set into the film within 8 msec. after the command and ahead of the next sync pulse.
8. At this time, the system will be ready for the next sync pulse to repeat the cycle once again.
9. Both the processor and projector portions of the system will advance film at the rate of 15 frames per second, all precisely synchronized to the 60 Hz line frequency from the logic circuitry.

The sync pulse referred to in the chart corresponds to a signal sent out by the original image input display device 14. The acceptable sync signal is one every 66.66 msec., which corresponds to the desired 15 frames per second. Note that every operation in the sequence is derived from the sync signal except the camera film advance command which is given only after the registration pins are completely pulled. This safety feature prevents film from being damaged if a malfunction occurs.

Specifics of the logic control circuitry do not form part of this invention and are not herein described. One of ordinary skill in the art could design such circuitry given the requirements of the camera/processor/projector as delineated above.

Although specific components proportions and process steps have been stated in the above description of preferred embodiments of the invention, other suitable materials, proportions and process steps, as listed herein, may be used with satisfactory results and varying degrees of quality. In addition other materials which exist presently or may be discovered may be added to materials used herein to synergize, enhance and otherwise modify their properties.

For example, it should be noted that the camera/processor/projector herein described can operate in two primary modes. More specifically, this system can operate in the normal camera/processor/projector mode wherein all three steps are accomplished, or it may in the projector-only mode.

Additionally, it should be noted that it would be within the spirit of this invention to add known items such as out-of-film sensors, sound equipment, etc.

Furthermore, by way of example, it is contemplated that the registration pin need not necessarily be elongated, or extend in the same direction as the direction of travel thereof.

It will be understood that various changes in the details, materials, steps and arrangements of parts which have been described and illustrated in order to explain the nature of the invention, will occur to, and may be made by those skilled in the art upon a reading of the disclosure within the principles and scope of the invention.

What is claimed is:

1. An apparatus for exposing, developing, and projecting a photosensitive web which includes holes along the longitudinal plane thereof, said apparatus comprising:
    first drive means for advancing said web adjacent camera means, said first drive means advancing at least one individual segment of said web into approximate alignment with an aperture of the camera; said first drive means comprising first and second intermittent film drive means for driving the web through said camera means and an image projection means, respectively, and first and second continuous film drive means for driving the web through means for sensitizing and developing the web, respectively;
    said camera means, including an aperture;
    registration means for finely aligning at least one individual segment of the web with the aperture by moving the segment in the plane thereof from its approximate alignment position; said registration means comprising at least one registration pin adapted to engage at least one hole; and second drive means to advance and retract said pin along a single straight line, toward and away from the plane of the web, whereby said pin intermittently engages the holes of the web to thereby finely align at least one individual segment with said aperture by moving the segment in the direction of the force exerted on the hole walls by the sides of said pin; and a stationary support member mounted adjacent the path of the web; and a carrier member slidingly mounted on the support member and having attached thereto at least one said registration pin;
    means for sensitizing the web before imagewise exposure by said camera means;
    said image development means;
    said image projection means;
    a vacuum platen adjacent the path of the web opposite said aperture to hold said web in a substantially flat plane;
    wherein the path of the web leads from the means for sensitization, to the camera means, to the development means, and then to the projection means; and between each of these means is a means for temporarily storing portions of the web comprising at least one stationary roller and one mechanically biased roller.

2. Apparatus as set forth in claim 1 wherein said registration means temporarily engages said web each time at least one individual segment is approximately aligned with said aperture.

3. Apparatus as set forth in claim 1 wherein the hole on said web is a detent.

4. Apparatus as set forth in claim 1 wherein the hole on said web is a perforation.

5. Apparatus as set forth in claim 4 wherein said at least one registration pin is tapered and is the same cross-sectional size as said perforation at the point of complete engagement.

6. Apparatus as set forth in claim 1 wherein said second drive means comprises:
    a rotatable cam; and
    at least one cam follower attached to said carrier member and adapted to follow the surface of said rotatable cam.

7. Apparatus as set forth in claim 6 wherein said at least one cam follower is two cam followers attached to said carrier member and said rotatable cam is positioned between the two whereby rotation of said cam causes the carrier member to reciprocate toward and away from the plane of said web.

8. Apparatus as set forth in claim 1 wherein said means for sensitizing is a corona discharge device.

9. Apparatus as set forth in claim 1 further including a vacuum platen adjacent the path of said web opposite said aperture to hold said web in a substantially flat plane.

10. Apparatus as set forth in claim 1 further including a damper means after said camera means and just before said development means, said damper means comprising a toothed idler roller and adjustable drag therefor to dampen perturbations in the web prior to said roller from reaching said development means.

11. Apparatus as set forth in claim 10 wherein said development means includes at least one liquid meniscus of developing fluid.

12. An apparatus for exposing, developing, and projecting a photosensitive web which includes perforations along the longitudinal plane thereof, said apparatus comprising:
    first drive means for advancing the web adjacent camera means, said first drive means advancing at least one individual segment of the web into approximate alignment with an aperture of the camera means;
    said camera means, including an aperture;
    registration means for finely aligning at least one individual segment of the web with the aperture by moving the segment in the plane thereof from its approximate alignment position; said registration means comprising at least one registration pin adapted to engage at least one perforation; and second drive means to advance and retract said pin along a single straight line, toward and away from the plane of the web, whereby said pin intermittently engages the perforations on the web to thereby finely align at least one individual segment with said aperture by moving the segment in the direction of the force exerted on the perforation walls by the sides of said pin; and a stationary support member mounted adjacent the path of the web; and a carrier member slidingly mounted on the support member and having attached thereto at least one said registration pin; wherein at least one said registration pin is electrically grounded and is tapered and is the same cross-sectional size as said perforation at the point of complete engagement;
    image development means; and
    image projection means.

* * * * *